Dec. 9, 1941.                M. A. DALOTEL                2,265,896
            FOCUSING DEVICE FOR MOTION AND STILL PICTURE CAMERAS
                     Filed Dec. 22, 1939          2 Sheets-Sheet 1
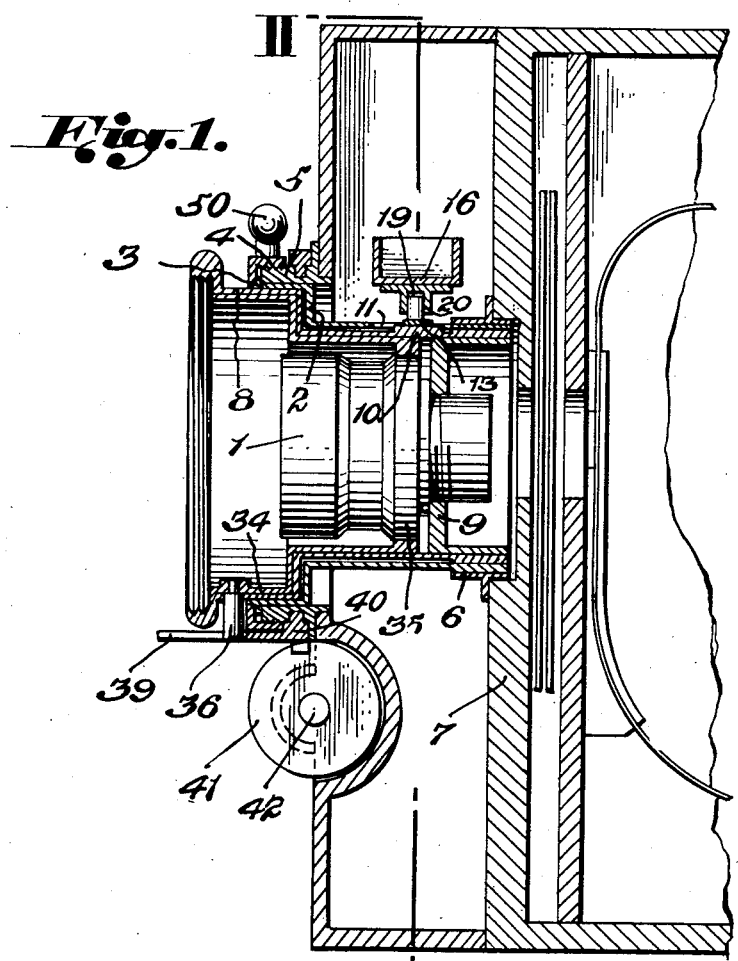
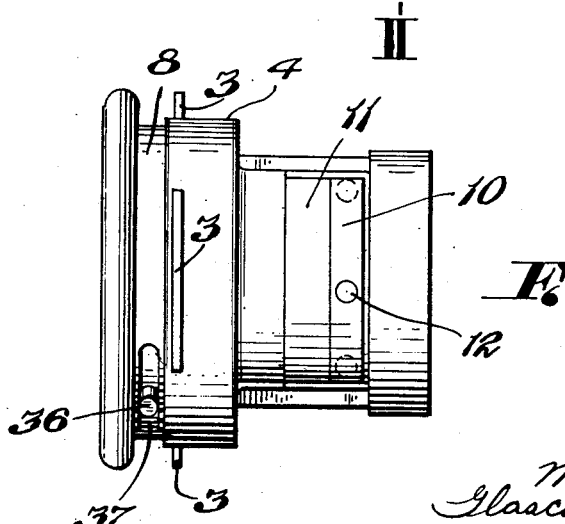

Dec. 9, 1941.  M. A. DALOTEL  2,265,896
FOCUSING DEVICE FOR MOTION AND STILL PICTURE CAMERAS
Filed Dec. 22, 1939  2 Sheets-Sheet 2

Inventor,
M. A. Dalotel
By: Glascock Downing + Seebold
Attorneys.

Patented Dec. 9, 1941

2,265,896

UNITED STATES PATENT OFFICE 2,265,896

FOCUSING DEVICE FOR MOTION AND STILL PICTURE CAMERAS

Maurice Albert Dalotel, Deuil, France, assignor to Suzanne Rosalie Mathot, Paris, France Application December 22, 1939, Serial No. 310,625
In France December 22, 1938

3 Claims. (Cl. 95—45)

The present invention relates to a device for controlling the focusing of motion and still picture cameras, and is applicable in particular to cameras which are adapted to be equipped with objectives of different focal lengths. It has already been proposed to use for this purpose the well known control device in which the mount of the objective is provided with a helical groove (or with a straight slope extending obliquely to the axis) in which is engaged an actuating finger which is movable in a plane extending transversely to the axis of the objective, the objective mount being adapted to slide without rotating relatively to the camera. It will be understood that by choosing for each objective the pitch of the helix (or the inclination of the slope) according to the focal length of said objective, a transmission will be readily obtained having a ratio which is variable from one objective to the other and which enables the same scale of distances to be used for focusing objectives of different focal lengths. However, this method of constructing the control mechanism is not very satisfactory in practice, since the movements imparted to the various objectives for a focus corresponding to a given distance of the subject have to be absolutely proportional to the focal lengths of said objectives; now, such objectives are supplied by the manufacturers with a tolerance of 3% on the focal length; consequently, it is essential to determine in each objective the pitch of the helical groove (or the inclination of the slope) by means of tests carried out with said objective in order to be certain that the focuses for all the distances correspond to the pre-graduated scale (which is the same for all motion and still picture cameras of the same type) so that the objectives shall be interchangeable with each other. On the other hand, this mechanism can only operate in the case in which the helix (or the slope) is inclined at less than 45° to the axis of the objective, so that it cannot be used for objectives of very long focal length. Finally, the helices (and the slopes) as well as the finger which controls them are subject to fairly rapid wear in spite of the choice of very hard materials, since the finger is generally spherical and bears against the edges of the helical groove only at two diametrically opposite points.

The purpose of the device which is the object of the present invention is to overcome these drawbacks and it is characterized by the fact that on the objective mount is fixed a finger which is arranged in a plane perpendicular to the optical axis of the objective and the transverse displacement of which relatively to said axis is determined (and moreover adjustable) according to the focal length of the objective, said finger being engaged in a groove provided in an actuating lever which is pivoted on the frame of the camera and is rotatable in a plane parallel with the optical axis of the objective.

By way of example, one embodiment of the focusing control device which is the object of the invention, has been described hereinafter and illustrated in the accompanying drawings, in which:

Fig. 1 is a sectional elevation of said device through the axis of the objective.

Fig. 4 is a plan view of the objective mount.

Figure 2:
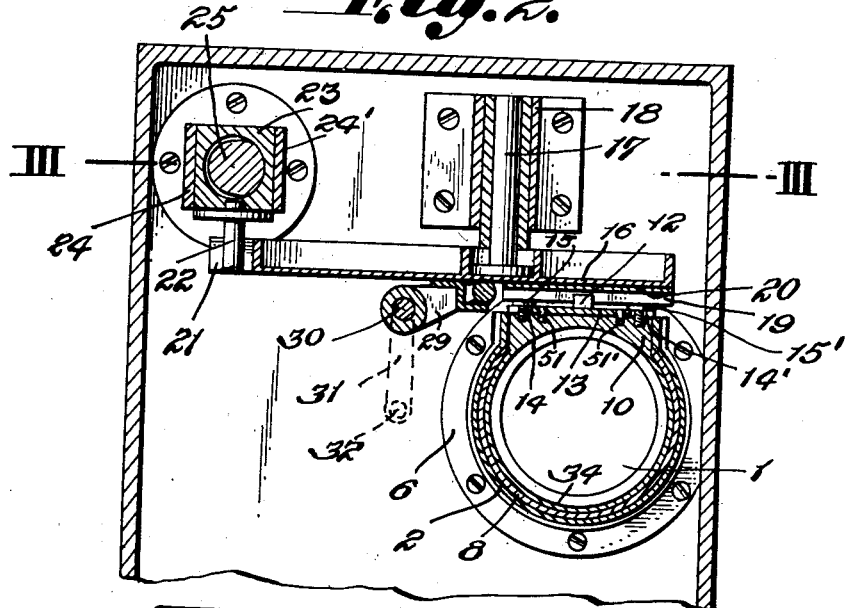
Fig. 2 is a transverse section thereof along the plane II—II of Fig. 1.

In the device shown in the drawings, the objective 1 is mounted in a universal mount which comprises a fixed outer tube 2 provided with projecting ears 3 by means of which it is clamped, by a nut 4 provided with corresponding ears, against a socket shaped collar 5 secured to the front wall of the camera, a second socket 6 secured to the intermediate partition 7 of the camera effecting with the collar 5 the centering of said tube 2. Inside the fixed tube 2 is lodged a tube 8 which is adapted to move relatively to the tube 2 and in which is fixed the objective 1 by means of the ring 9 in which said objective is screwed. The inner movable tube 8 carries a transverse expansion or boss 10 (Figs. 2 and 3) the upper cross-section of which is rectangular and which passes through a longitudinal opening 11, the upper cross-section of which is likewise rectangular, provided in the fixed tube 2 which serves at the same time for guiding the movement of the tube 8 which can thus only slide without rotating in the tube 2.

On the boss 10 is fixed a cylindrical finger 12, whose transverse displacement relatively to the vertical plane of symmetry of the objective is determined (and adjusted) according to the focal length of the objective. For this purpose, the finger 12 is permanently fixed on a plate 13 provided with slots 14, 14' through which pass the fixing screws 15, 15'. When the adjustment has been effected, locking is obtained by means of the centering feet 51, 51'. A lever 16, fulcrumed by means of the journal 17 in a bearing 18 secured to the camera, is provided with a longitudinal groove 19 formed, for example, by an inverted channel member 20 (Fig. 1) which is fixed on the lower face of the lever 16 and in which is engaged the cylindrical finger 12 secured to the slidable objective mount. It will be understood that the rotation of the lever 16 about the pivot 17 will cause a forward or backward longitudinal movement of the slidable objective mount or tube 8 and of the objective 1 that it carries, said movement being proportional, for a given angle of rotation of the lever, to the distance between the pivot 17 and the finger 12, so that the longer the focal length of the objective, the further will the finger 12 have to be shifted towards the right of Fig. 2 on the boss 10. The opposite end of the lever 16 terminates in a fork 21 engaging with a pin 22 (Figs. 2 and 3) carried by a nut 23 of rectangular external cross-section which is guided by lateral cheeks 24, 24° and can thus move without rotating along the threaded shaft 25 which is rotatable by means of a knob 26 provided with a graduation 27 representing the distances and rotating opposite a fixed mark 28.

Figure 3:
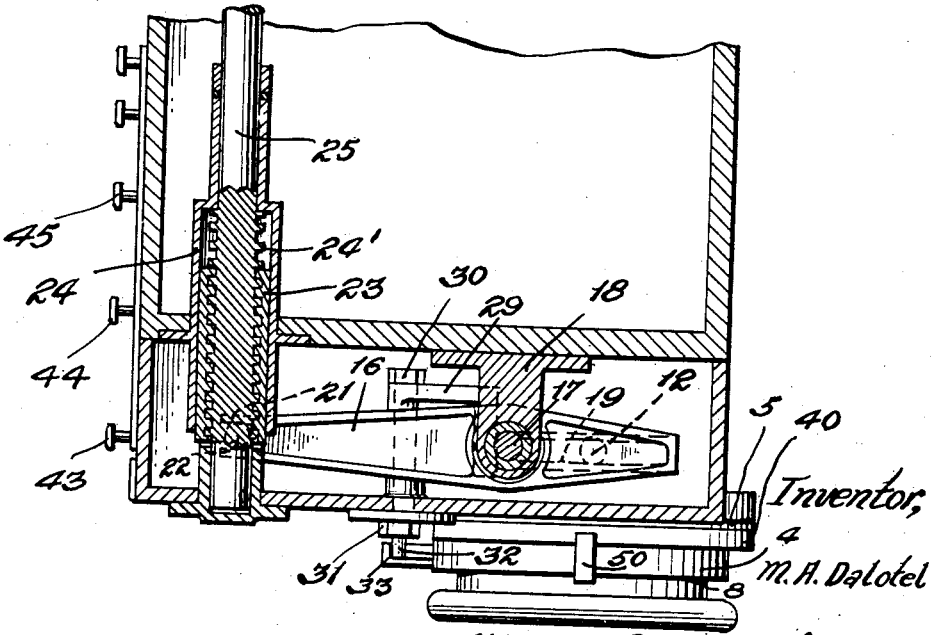
Fig. 3 shows a horizontal section along the plane III—III of Fig. 2 of the whole of the control device.

The adjustment of this mechanism is effected in the following manner:

In the first place, the control knob 26 is fixed on the shaft 25 in such a manner that the graduation representing infinity comes opposite the fixed mark 28 when the control lever 16 is directed perpendicular to the optical axis of the objective in the position shown in Fig. 3. The position of the objective 1 in the movable tube 8 is then so adjusted that, in this position of the lever, it is actually in focus for infinity. By acting on the knob 26, the control lever 16 is then brought into the corresponding position at the other end of the scale 27, for example, 1 metre, and the position is found of the finger 12 on the boss 10 in which the objective is in focus for the distance indicated, for this position of the lever, by the graduation 27. The finger 12 is then locked and is thus adjusted for the whole scale of distances.

For enabling a change of objective, the device comprises means for preventing the finger 12 from being engaged in the groove 19 of the control lever 16 so long as the fixed outer tube 2 is not locked by the nut against the collar 5, and the movable tube 8 is not at the end of its travel, to the right in Fig. 1, in the focus position for infinity. For this purpose, the journal 17 of the control lever 16 is mounted in its bearing 18 with sufficient axial play to enable said lever to be lifted and the finger 12 to be disengaged from the groove 19. This lifting is controlled by a lever 29 (Fig. 2) which is pivoted on the journal 30 and another arm of which, 31, carries a pin 32 engaged in a cam-groove 33 (Fig. 3) which is secured to the clamping nut 4 and is so shaped as to cause the control lever 16 to be lifted when the nut 4 leaves its clamping position on the ears 3 of the fixed tube 2. The nut 4 is actuated by means of a lever 50 (Fig. 1).

Inside the movable tube 8 is rotatably mounted a tube 34 (Fig. 2), the rotation of which actuates the diaphragm 35 of the objective. This tube 34 is actuated by means of a finger 36 which passes through a circular groove 37 which is provided in the front part of the movable tube 8 and engages with a fork 39 carried by a ring gear 40 which is centered on the collar 5 and is rotated by a pinion or worm 41 mounted on a shaft 42 actuated by means of a graduated knob not shown.

A fairly simple calculation shows that the above described device enables absolutely accurate focusing to be obtained, conditionally however on the distance of the subject being reckoned from the front focus of the objective. For this purpose, the camera is provided, on one of its side faces, with a number of marks which correspond, optionally with a constant difference, to the positions of the front foci of the various objectives used in the camera. Said marks may be formed, for example by studs 43, 44, 45, and so forth, (Fig. 3), on which can be hung a decametre rule serving for measuring the distance of the subject.

While I have illustrated and described the preferred form of construction for carrying my invention into effect, this is capable of variation and modification, without departing from the spirit of the invention. I therefore do not wish to be limited to the precise details of construction set forth, but desire to avail myself of such variations and modifications as come within the scope of the appended claims.

I claim:

1. A focusing control device for a motion or still picture camera with a set of objectives of different focal lengths provided with a universal mount, comprising a control lever having a longitudinal groove at one end, means pivotally mounting said lever adjacent to and transversely of the mount, means operatively connected to the other end of said lever for swinging the latter about its pivot in a plane parallel with the optical axis of the mount, a focusing scale associated with said last mentioned means, said universal mount including an outer tube extending through a wall of the camera and fixed thereto, and an objective carrying inner tube axially slidable in said outer tube but restrained against rotation with reference to said outer tube, a transverse boss on the inner end of the objective carrying tube arranged adjacent to and parallel with the grooved end of the control lever, a finger on said boss normally in engagement with the grooved portion of the control lever and movable therewith, and means on said boss for moving said finger transversely with reference to the objective carrying tube towards or away from the fulcrum point of said control lever.

2. A focusing control device for a motion or still picture camera with a set of objectives of different focal lengths provided with a universal mount, comprising a control lever of fork shape at one end and having a longitudinal groove at its other end, means pivotally mounting said lever adjacent to and transversely of the universal mount, means operatively connected to the forked end of said lever for swinging the latter about its pivot in a plane parallel with the optical axis of the objectives, said means including a threaded shaft parallel with the optical axis, a knob graduated in focusing distances secured to one end of said shaft for rotating the latter, a nut slidably mounted on said shaft but restrained from rotating relatively to said shaft, and a member carried by said nut and engaged in the fork of the control lever, an outer tube extending through a wall of the camera and fixed thereto, an objective carrying inner tube axially slidable in said outer tube but restrained against rotation with reference to said outer tube, a transverse boss on the inner end of the objective carrying tube arranged adjacent to and parallel with the grooved end of the control lever, a finger on said boss normally in engagement with the grooved portion of the control lever and adapted to be moved thereby, and means on said boss for moving said finger transversely with reference to the objective carrying mount towards or away from the fulcrum point of said control lever.

3. A focusing control device for a motion or still picture camera with a set of objectives of different focal lengths provided with a universal mount, comprising a control lever having a longitudinal groove at one end, means pivotally mounting said lever adjacent to and transversely of the mount, means operatively connected to the other end of said lever for swinging the latter about its pivot in a plane parallel with the optical axis of the objective, a focusing scale associated with said last mentioned means, said universal mount including an outer tube extending through a wall of the camera and fixed thereto, and an objective carrying inner tube axially slidable in said outer tube but restrained against rotation with reference to said outer tube, a transverse boss on the inner end of the objective carrying tube arranged adjacent to and parallel with the grooved end of the control lever, a finger on said boss normally in engagement with the grooved portion of the control lever and adapted to be moved thereby, means on said boss for moving said finger transversely with reference to the objective carrying tube towards or away from the fulcrum point of said control lever, and means for moving the grooved portion of the control lever out of engagement with the finger.

MAURICE ALBERT DALOTEL.